(12) United States Patent
Sulouff, Jr. et al.

(10) Patent No.: US 7,703,339 B2
(45) Date of Patent: Apr. 27, 2010

(54) FLOW SENSOR CHIP

(75) Inventors: Robert E. Sulouff, Jr., Chesapeake, VA (US); Craig E. Core, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 669 days.

(21) Appl. No.: 11/636,376

(22) Filed: Dec. 8, 2006

(65) Prior Publication Data

US 2008/0264181 A1   Oct. 30, 2008

Related U.S. Application Data

(60) Provisional application No. 60/748,908, filed on Dec. 9, 2005.

(51) Int. Cl.
   *G01P 5/06* (2006.01)
(52) U.S. Cl. .................................................. 73/861.85
(58) Field of Classification Search .............. 73/861.42, 73/861.47, 861.48, 861.53, 861.63, 196; 251/129.01
   See application file for complete search history.

(56) References Cited

U.S. PATENT DOCUMENTS

| | | | |
|---|---|---|---|
| 5,515,735 A * | 5/1996 | Sarihan | 73/861.47 |
| 6,502,467 B1 * | 1/2003 | Fincke | 73/861.63 |
| 6,813,964 B1 | 11/2004 | Clark et al. | 73/861.52 |
| 6,898,981 B1 | 5/2005 | Boillat et al. | 73/756 |
| 6,917,886 B2 | 7/2005 | Cohen et al. | 702/45 |
| 6,945,123 B1 * | 9/2005 | Kuehl et al. | 73/861.42 |
| 7,269,992 B2 * | 9/2007 | Lamb et al. | 73/1.41 |
| 7,540,469 B1 * | 6/2009 | Okandan | 251/129.01 |
| 2002/0116994 A1 * | 8/2002 | Heinonen | 73/196 |
| 2005/0176163 A1 | 8/2005 | Brosnihan et al. | 438/48 |
| 2006/0180896 A1 | 8/2006 | Martin et al. | 257/619 |

OTHER PUBLICATIONS

M.A. Boillat, et al., A Differential Pressure Liquid Flow Sensor for Flow Regulation and Dosing Systems, IEEE, pp. 350-352, 1995.
Analog Devices, 24-Bit Capacitance-to-Digital Converter with Temperature Sensor AD7745/AD7746, Analog Devices, Inc., pp. 1-28, 2005.
Jaesung Jang, A Capacitive Micro Gas Flow Sensor Based on Slip Flow, IEEE, pp. 540-543, 2004.

* cited by examiner

*Primary Examiner*—Jewel Thompson
(74) *Attorney, Agent, or Firm*—Sunstein Kann Murphy & Timbers LLP

(57) ABSTRACT

A flow sensor has an inlet chamber with a first pressure sensor and an inlet port for receiving fluid, and an outlet chamber with a second pressure sensor and an outlet port. The flow sensor also has an anemometer in fluid communication with at least one of the two chambers.

19 Claims, 5 Drawing Sheets

FLOW SENSOR CHIP

PRIORITY

This patent application claims priority from provisional U.S. patent application No. 60/748,908, filed Dec. 9, 2005, entitled, "FLOW SENSOR CHIP," and naming Robert E. Sulouff Jr. and Craig E. Core as inventors, the disclosure of which is incorporated herein, in its entirety, by reference.

FIELD OF THE INVENTION

The invention generally relates to flow control and, more particularly, the invention relates to chip level flow control sensors.

BACKGROUND OF THE INVENTION

Fluid flow sensors are used in a wide variety of applications. For example, in the medical area, flow sensors commonly are used to detect the volume of fluid per unit time (i.e., the fluid flow rate) of medicament infused into a patient through an IV tubing set.

A number of techniques can be used to determine the fluid flow rate. One technique uses spaced pressure sensors within a fluid flow path. Unfortunately, although devices implementing such technique can determine the fluid flow rate, they provide no information identifying the mass flow rate of the fluid (i.e., the mass of fluid flow per unit time).

SUMMARY OF THE INVENTION

In accordance with one embodiment of the invention, a flow sensor has an inlet chamber with an inlet port for receiving fluid and a first pressure sensor, and an outlet chamber with an outlet port and a second pressure sensor. The flow sensor also has an anemometer in fluid communication with at least one of the two chambers.

Some embodiments have additional pressure sensors to increase the effective range of the sensor. To that end, the flow sensor may have a third pressure sensor (within the inlet chamber) that senses a third pressure range. To improve sensing range, the third pressure range may be different than the pressure range sensed by the first pressure sensor. In a corresponding manner, the flow sensor may have a fourth pressure sensor (within the outlet chamber) that senses a fourth pressure range. To further improve sensor range, the fourth pressure range may be different than the pressure range sensed by the second pressure sensor. In some embodiments, the pressure sensors and anemometer may also exist in a constricted region between the inlet and outlet chambers.

In illustrative embodiments, the first pressure sensor and the second pressure sensor are MEMS devices, and may be contained within a leadframe package. Moreover, the anemometer and first and second pressure sensors may be formed on a single die.

The flow sensor also may have a substrate and a cap that form an interior chamber, which includes the first and second chambers, and a constricted region fluidly connecting the first and second chambers. In addition, the anemometer may have a first element for detecting mass flow rate, and a second element for detecting fluid temperature. The first element illustratively is downstream of the second element.

In accordance with another embodiment of the invention, a flow sensor has an internal chamber, a differential pressure apparatus within the internal chamber, and a mass flow rate meter within the internal chamber.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a single chip has a plurality of pressure sensors for detecting fluid flow rate. Other embodiments use a mass flow meter in combination with a plurality of pressure sensors for detecting both fluid flow rate and mass flow rate of a given fluid. In fact, this functionality may be implemented on a single die using MEMS micromachining technology. Details of illustrative embodiments are discussed below.

Figure 1:
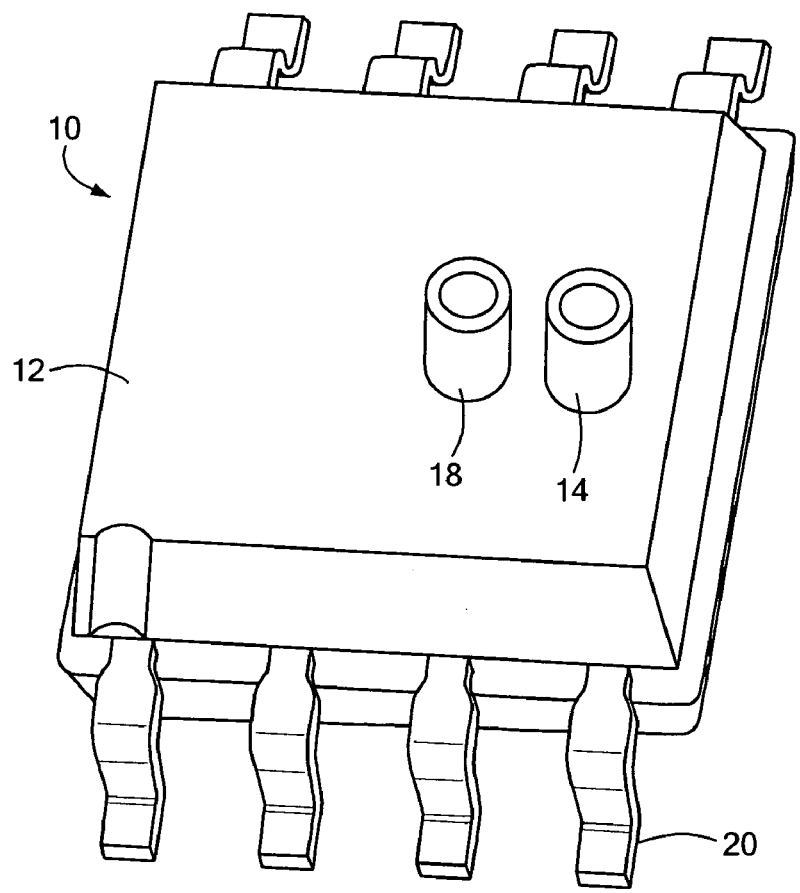
FIG. 1 schematically shows perspective view of a packaged flow sensor system that may be configured in accordance with illustrative embodiments of the invention.

FIG. 1 schematically shows perspective view of a packaged flow sensor system 10 that may be configured in accordance with illustrative embodiments of the invention. As shown, the system 10 has a transfer molded, leadframe package 12 encapsulating one or more chips for detecting and determining both the fluid flow rate and the mass flow rate of a fluid channeled therethrough. To that end, the system 10 has a system inlet 14 for receiving a fluid, an interior 16 (discussed in greater detail below and also referred to as a chamber 16, which is primarily within a subsequently discussed die) for channeling fluid, and a system outlet 18 for delivering fluid channeled through the interior 16. In addition, the system 10 has a plurality of pins 20 for electrically communicating with exterior devices. For example, the pins 20 may be soldered to a printed circuit board, which may have additional components for processing output signals from the system 10.

During use, the system inlet 14 may be connected to a fluid conduit (not shown) for receiving fluid from some source, while the system outlet 18 may be connected to another fluid conduit. For example, in the medical context, the system inlet 14 may couple with a medicine bag hanging form an IV pole, while the system outlet 18 may connect to a medical valve connected to a patient's vein. It is anticipated that the fluid flow rate of the fluid flowing into the system inlet 14 will be substantially the same as the fluid flow rate of the fluid flowing from the system outlet 18. In some embodiments, however, those flow rates may vary.

It should be noted that discussion of some specific details of the system 10 shown in FIG. 1 is illustrative and not intended to limit the scope of many embodiments. For example, rather than use pins 20, the system 10 could use pads, or be leadless, for facilitating a surface mounted connection to some underlying interconnect apparatus. As another example, the system 10 may use a premolded, leadframe package rather than a transfer molded package.

Figure 2:
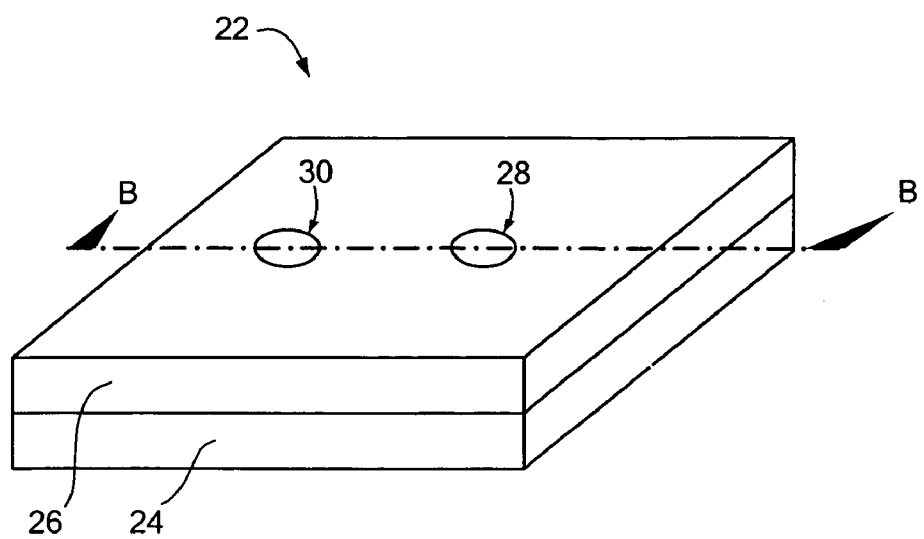
FIG. 2 schematically shows a perspective view of a flow sensor chip that may be configured in accordance with illustrative embodiments of the invention.

FIG. 2 schematically shows a perspective view of an illustrative flow sensor die 22 within the system 10 shown in FIG. 1. Specifically, the die 22 is a single chip implementation having a silicon substrate 24 supporting various functionality (i.e., a MEMS hot film anemometer and differential pressure sensors, both discussed below), and a cap 26 to form the above noted interior fluid channel/chamber 16. Although the substrate 24 itself is a die, for discussion purposes of certain embodiments, the die 22 includes both substrate 24 and the cap 26. Among other things, the cap 26 may be formed from a corresponding silicon die etched in a prescribed manner. In addition, the cap 26 also has a cap inlet 28 for receiving fluid (e.g., a liquid or gas), and a cap outlet 30 for delivering fluid flowing through the interior 16 of the die 22. Of course, when secured within the system 10, the cap inlet 28 should be fluidly aligned with the system inlet 14. In like fashion, the cap outlet 30 also should be fluidly aligned with the system outlet 18.

It should be noted that although the substrate 24 and cap 26 are discussed as single dies, those skilled in the art should understand that various implementations can be produced from wafers having arrays of cavities and/or MEMS structure. After forming the appropriate structure or circuitry, conventional wafer batch processing techniques may dice these wafers to form the individual die 22.

Figure 3:
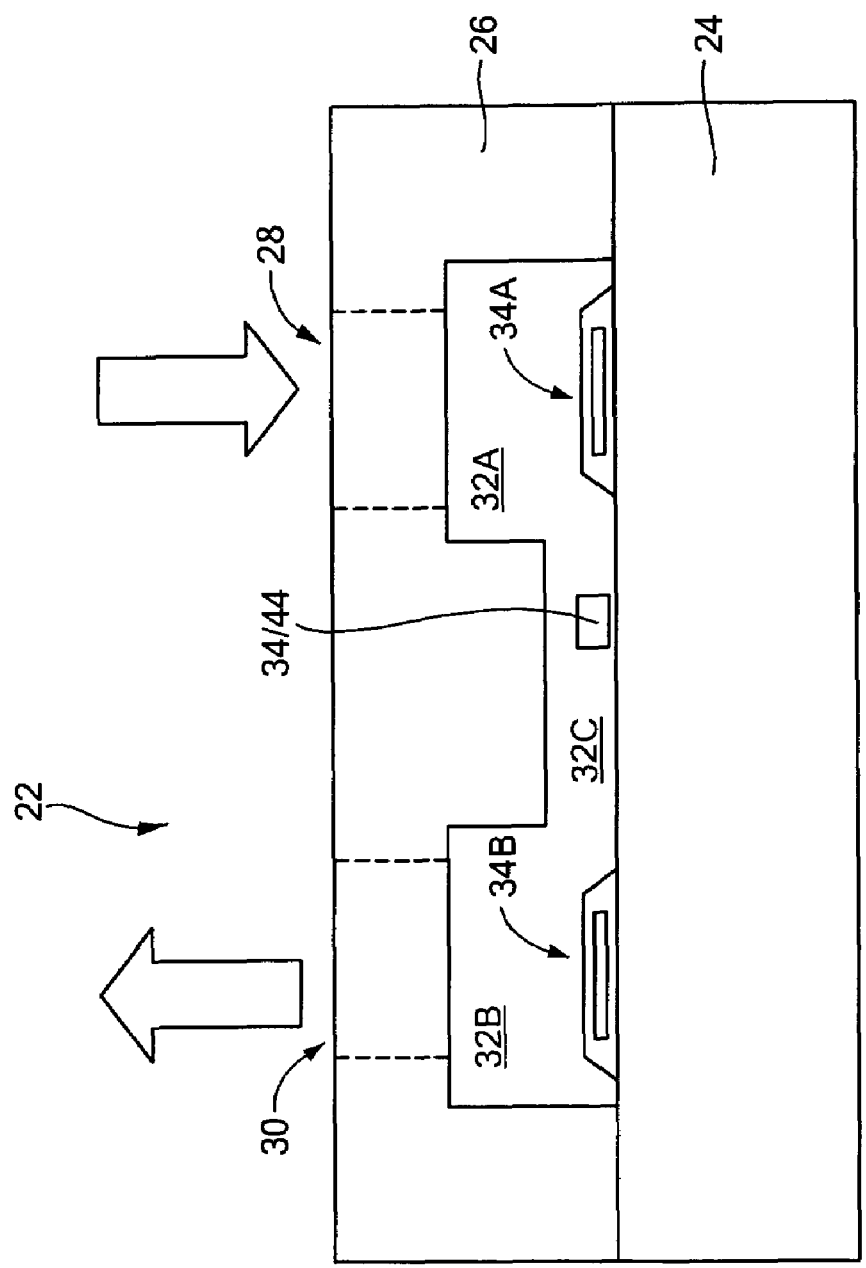
FIG. 3 schematically shows a cross-sectional view of the flow sensor chip of FIG. 1 across line B-B.

FIG. 3 schematically shows a cross-sectional view of the flow sensor chip of FIG. 1 across line B-B. This view shows some details of the interior 16 of the chip 22, which contains a differential pressure sensor system for detecting fluid flow rate. Specifically, FIG. 3 shows the interior fluid chamber 16 (formed by the cap 26 and substrate 24), which is configured to have a varying inner dimension. To that end, the fluid chamber 16 has an inlet section 32A, an outlet section 32B, and a constricted section 32C between the sections 32A and 32B. FIG. 3 schematically shows this relationship, with one or more pressure sensors 34A or 34B (identified generically below, however, by reference number 34) positioned within each of the sections 32A and 32B.

Accordingly, fluid follows the following path through the die 22:
- enters through the cap inlet 28,
- traverses into the inlet section 32A and over the first pressure sensor 34A,
- traverses through the constricted section 32C and into the outlet section 32B over the second pressure sensor 34B, and
- exits through the cap outlet 30.

External circuitry 28 (shown only schematically in FIG. 8 as a circuit chip 36, discussed below) calculates the difference in pressure between the first and second pressure sensors 34A and 34B. Widely known techniques may be used to calculate fluid flow rate based upon this differential pressure.

In some embodiments, at least one of the pressure sensors 34A or 34B may be positioned within the constricted section 32C. For example, the pressure sensor 34A receiving the inlet flow may be positioned within the constricted section 32C. Moreover, flow direction can change in some embodiments. In that case, the ports 28 and 30 respectively would act as outlet and inlet. Those skilled in the art should understand that principals discussed with the noted implementation apply to such other embodiments. It also should be noted that the interior 16 may have additional components, some of which are discussed in greater detail below.

Figure 4:
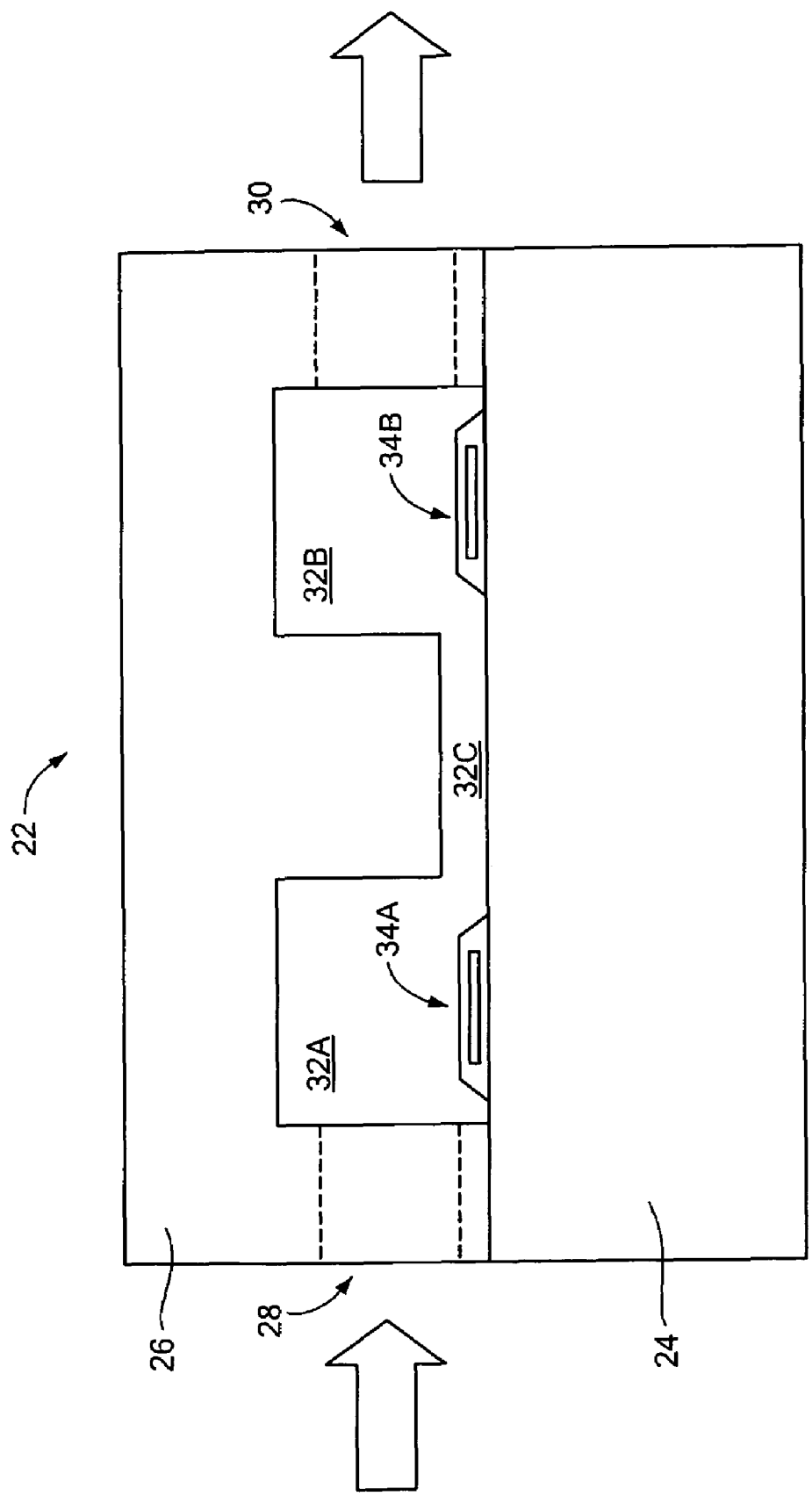
FIG. 4 schematically shows a cross-sectional view of a flow sensor produced in accordance with another embodiment of the invention.

FIG. 4 schematically shows another embodiment of the invention, in which the cap inlet and outlet 28 and 30 are located through the side of the cap 26. Accordingly, based upon the orientation of this embodiment in FIG. 4, fluid enters through the cap inlet 28 on the left, and exits through the cap outlet 30 on the right. Those skilled in the art should understand, however, that the ports 28 or 30 may be positioned in a variety of locations. For example, one port 28 or 30 may be positioned at the top of the cap 26, while the other port 20 or 22 may be positioned in the side of the cap 26. It is even anticipated that one or more of the ports 28 or 30 may be positioned through the substrate 24. According, discussion of the exact location of the ports 28 or 30 is illustrative and not intended to limit all embodiments.

Some embodiments have more than two pressure sensors 34 to increase the range of pressures detected by the die 22. For example, the inlet section 32A may have two different pressure sensors 34A. One pressure sensor 34A may detect pressures in a first, lower range, while the second pressure sensor 34A may detect pressures in a second, higher range. The lower and higher ranges may overlap, or be nonoverlapping, generally contiguous ranges. To that end, the pressure sensors 34A and 34B may have different physical characteristics, such as differing diaphragm sizes, differing diaphragm thickness, or differing diaphragm materials.

For example, the diaphragm (generally shown in FIG. 5 and identified by reference number 38A) of a first pressure sensor 34 may have a larger diameter than that of a second pressure sensor 34. As a result, the two diaphragms move differently, despite being subjected to substantially the same pressure, thus impacting the variable capacitance of the pressure sensors 34. Accordingly, one diaphragm may be fabricated to a size that effectively detects pressures in a first range, while the second diaphragm is fabricated to detect pressures in a second range. This technique thus effectively increases the range of pressures that the differential sensor system can detect.

Some embodiments use even more than two pressure sensors 34 within the same section 32A or 32B. For example, three or more pressure sensors 34 may be used in the inlet section 32A. In addition, the outlet section 32B, or other parts of the interior 16, also may have plural pressure sensors 34 for the same reasons.

Figure 5:
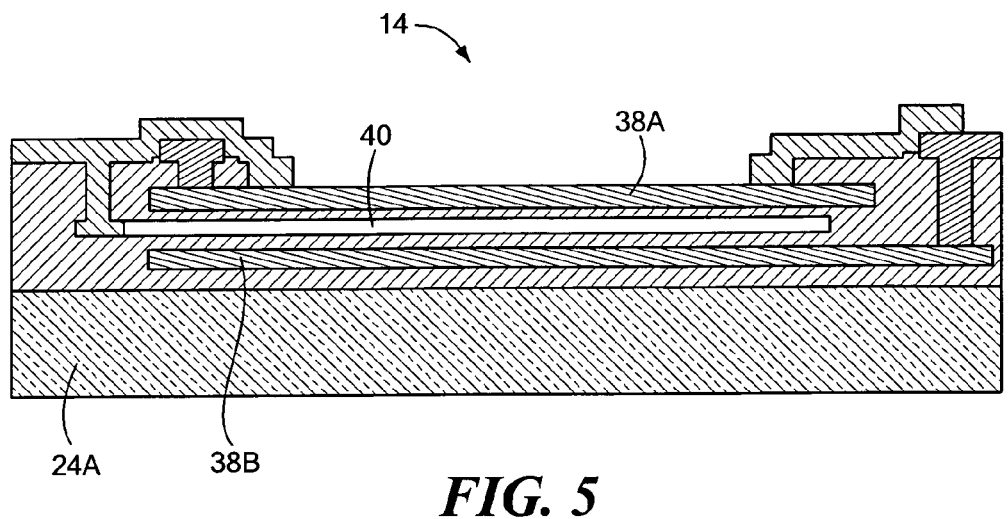
FIG. 5 schematically shows a cross-sectional view of a pressure sensor that may be used with illustrative embodiments of the invention.

FIG. 5 schematically shows a generic MEMS pressure sensor 34 that may be used in illustrative embodiments of the invention. Of course, other pressure sensors may be used and thus, the pressure sensor 34 shown in FIG. 5 is an example only. More specifically, the pressure sensor 34 has a substrate 24A (i.e., the substrate 24 of the die 22) supporting a pair of conductive electrodes 38A and 38B that form a variable capacitor. One of the electrodes 38A is flexible (i.e., it is the diaphragm of the pressure sensor), while the other electrode 38B is static. The pressure sensor 34 forms a hollow, hermetically sealed cavity 40 (between the electrodes 38A and 38B) that illustratively has a predetermined low pressure, or a zero pressure, such as a vacuum.

The electrodes 38A and 38B illustratively are formed from polysilicon deposited by conventional micromachining processes. Accordingly, the pressure sensors 34 may be considered to be formed on the substrate 24, or as a part of the substrate 24. For additional exemplary information relating to various embodiments of the pressure sensor 34 and methods for its fabrication, see U.S. patent application Ser. No. 11/049,205, filed Feb. 2, 2005 and entitled, "METHOD OF FORMING A DEVICE BY REMOVING A CONDUCTIVE LAYER OF A WAFER," the disclosure of which is incorporated herein, in its entirety, by reference. Of course, those skilled in the art may use other methods of fabricating the pressure sensors 34. Accordingly, discussion of this specific process is for illustrative purposes only.

The materials along the flow path within the die 22 preferably have no greater than a negligible impact on fluid within the chamber 24. In addition, some embodiments electrically isolate certain components within the die 22 from the fluid. To that end, various embodiments passivate the diaphragms of the pressure sensors 34A and 34B with a layer of passivation material (not shown). Among other things, nitride or parylene may suffice in certain applications. In medical and other applications, the layer should be biocompatible and not create residual stress on the diaphragms.

In accordance with illustrative embodiments, in addition to having a differential pressure sensor system for detecting fluid flow rate, the sensor die 22 also has an integrated mass flow rate meter for detecting the mass flow rate of the fluid passing through its interior 16. A number of different types of mass flow rate meters may be used.

Figure 6:
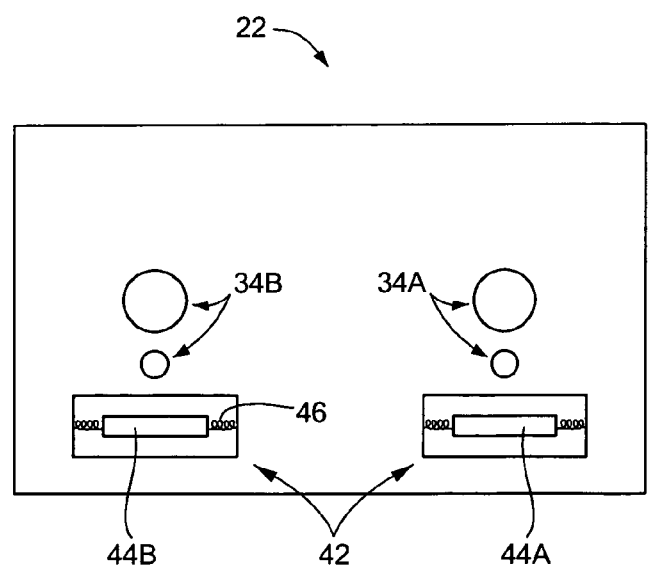
FIG. 6 schematically shows a plan view of an uncapped flow sensor die configured in accordance with illustrative embodiments of the invention.

For example, illustrative embodiments implement a hot film anemometer 42 on the substrate 24 of the die 22. More specifically, FIG. 6 schematically shows a plan view of the substrate 24, with the cap 26 removed, to show both the pressure sensors 34A and 34B and two elements 44A and 44B forming the anemometer 42. As shown, the anemometer 42 has a low temperature resistive element 44A that is upstream of a higher temperature resistive element 44B. These elements 44A and 44B may be within any portions of the interior, including within the inlet section 32A, outlet section 32B and/or constricted section 32C. As an example, see FIG. 3, which schematically shows the elements 44A or 44B, or a pressure sensor 34A or 34B, as being within the constricted region (identified in that figure by reference "34/44")

As known by those skilled in the art, the low temperature resistive element 44A merely detects the ambient temperature of the fluid, while the higher temperature resistive element 44B is heated to a temperature that is higher than the ambient fluid temperature. For example, the higher temperature resistive element 44B may be maintained at about 2-10 degrees C. higher than the ambient fluid temperature.

To those ends, circuitry controls current flow through (or voltage across) both resistive elements 44A and 44B to ensure effective functionality. For example, circuitry may vary the voltage or current across the two elements 44A and 44B, and detect the power dissipation of the higher temperature resistive element 44B to determine the mass flow rate of the fluid. In some embodiments, the high temperature resistive element 44B receives a varying voltage (or current) that is always at some positive value. Other embodiments, however, pulse width modulate that voltage (or current) to one or both elements 44A and 44B, thus reducing the impact at least of the higher temperature heating element 44B on the fluid. In other words, such embodiments provide a signal at some duty cycle (e.g., a 50-60 percent duty cycle) to minimize any heating of the fluid.

Off-chip circuitry detects the temperature difference between the higher temperature resistive element 44B and the ambient fluid temperature and, if necessary, adjusts the current to maintain the higher temperature resistive element 44B at a prespecified temperature. As known by those in the art, conventional processes use this fluctuating current to determine mass flow rate of the fluid.

The resistance of the resistive elements 44A and 44B change as their respective temperatures change. Accordingly, rather than varying the current through at least the higher temperature resistive element 44B to detect mass flow rate, some embodiments transmit a constant current through both resistive elements 44A and 44B at a prespecified ratio. For example, this embodiment may transmit ten times the current through the higher temperature resistive element 44B than it transmits through the low temperature resistive element 44A.

These embodiments therefore read the resulting fluctuating voltage across one or both of these two resistive elements 44A and 44B to determine the mass flow rate of the fluid. In other words, circuitry uses the resultant fluctuating voltage across one or both of the resistive elements 44A and 44B to calculate mass flow rate.

Of course, circuitry may use other techniques for detecting mass flow rate with the anemometer 42. For example, rather than driving current and reading voltages, some embodiments may drive voltage and read current. Accordingly, discussion of specific techniques of using the anemometer 42 for determining mass flow rate is illustrative and not intended to limit all embodiments of the invention.

In illustrative embodiments, the two resistive elements 44A and 44B are formed by the same fabrication process used to form the diaphragms. Accordingly, using the examples discussed, the resistive elements 44A and 44B may be formed from deposited, micromachined polysilicon. Unlike the diaphragms, however, the cavities below the two elements 44A and 44B are exposed to the interior chamber 16 formed by the cap 26 and substrate 24; they are not sealed. The elements 44A and 44B thus may be coupled with the substrate 24 by means of a tether or spring 46, as shown in FIG. 6. In some embodiments, however, the cavities below the elements 44A and/or 44B are sealed to provide thermal isolation for the resistive elements.

Figure 7:
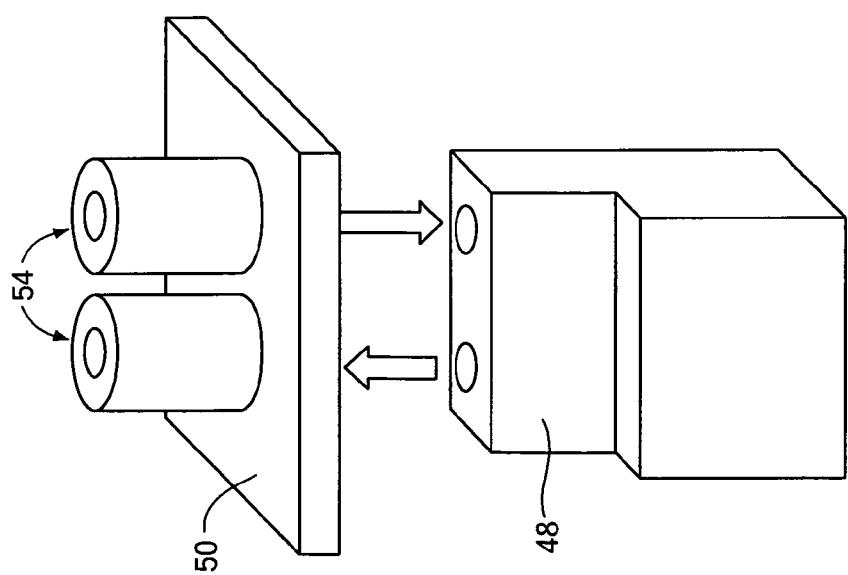
FIG. 7 schematically shows the exterior of a packaged flow sensor chip and its corresponding cover.

Some embodiments encapsulate the flow sensor chip 22 within its own package 48. More specifically, FIG. 7 schematically shows the flow sensor chip 22 and a flow sensor cover 50, while FIG. 8 schematically shows a partially cut away view of the entire flow detection system 10 shown in FIG. 1.

Figure 8:
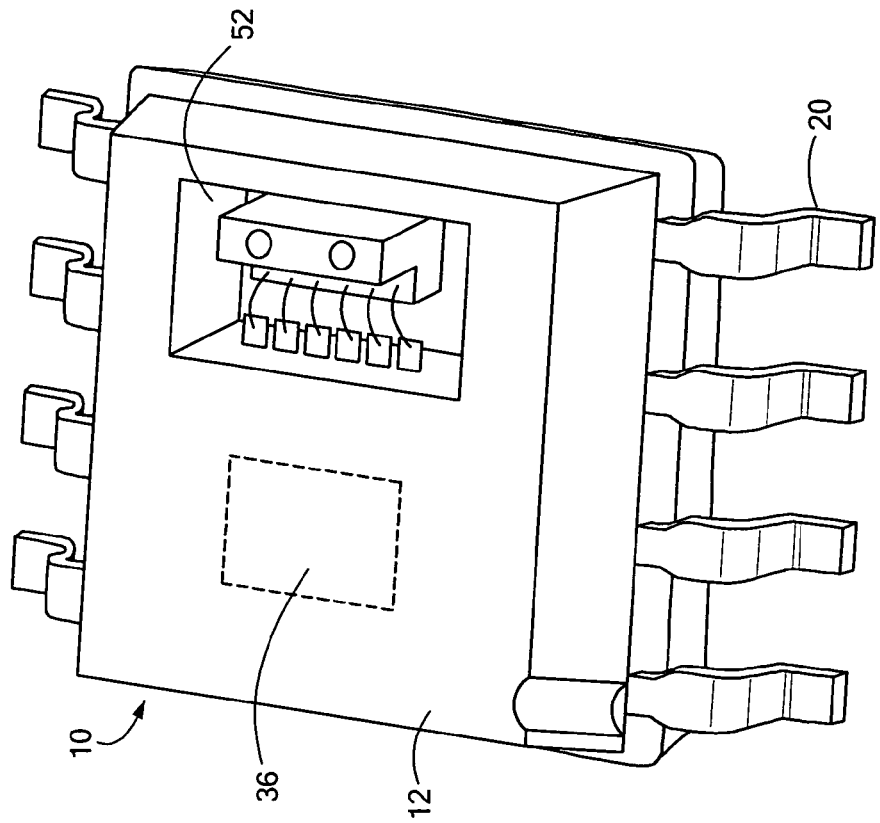
FIG. 8 schematically shows the packaged flow sensor system of FIG. 1 with a portion cut away.

In particular, the system 10 shown in FIGS. 1 and 8 has the noted circuit chip 36 (with electronics for controlling system performance), which is fully encapsulated/overmolded in the package 12 (e.g., a leadless, surface mountable package). As noted above, the circuit chip 36 may have a wide range of functionality, such as circuitry for controlling current flow through the resistive elements 44A and 44B, and additional circuitry for detecting pressure differential between the pressure sensors 34A and 34B. This circuit chip 36 may coordinate with off-chip circuitry to both control and monitor the functionality on the system 10.

The package 12 also has a chip cavity 52 in which the packaged sensor die 22 is secured. This chip cavity 52 illustratively is formed using premolded packaging technology. Once secured within the cavity 52 and appropriate interconnections are made, conventional processes secure the cover 50 over the flow sensor die 22 to enclose it within the package 12. In illustrative embodiments, the cover 50, which has conduits 54 ultimately forming the system inlet and outlet 14 and 18, is overmolded to form the system inlet and outlet 14 and 18. The system inlet and outlet 14 and 18 illustratively respectively are aligned in registry with the cap inlet and outlet 28 and 30 of the sensor die 22.

Accordingly, tubing or other fluid flow devices (e.g., syringes or IV tubes coupled with a saline or medicine bag) may be coupled with the conduits 54 to provide fluid flow through the system 10/sensor die 22. The flow sensor can also be interfaced with pumps or drug delivery devices, among other things, to provide control information. The pressure sensor information in the inlet and outlet chambers can provide pump and patient information, in addition to fluid flow. This fluid flow rate through the system 10 can be very low, such as those typically used in drug delivery applications, or higher, as the application requires.

Illustrative embodiments therefore can detect both fluid flow rate and mass flow rate of a fluid. Using the mass flow rate, those skilled in the art can determine the type of fluid or, sometimes, the actual fluid flowing through the system 10.

Fabricating the system in a single package, and/or in a single chip, using MEMS technology both minimizes the footprint while effectively enabling this implementation.

Although the above discussion discloses various exemplary embodiments of the invention, it should be apparent that those skilled in the art can make various modifications that will achieve some of the advantages of the invention without departing from the true scope of the invention.

What is claimed is:

1. A flow sensor comprising:
   a substrate and a cap that form an interior chamber, the interior chamber including an inlet chamber, an outlet chamber and a constricted region fluidly connecting the inlet chamber to the outlet chamber;
   the inlet chamber having an inlet port for receiving fluid;
   a first pressure sensor within the inlet chamber;
   the outlet chamber having an outlet port;
   a second pressure sensor within the outlet chamber; and
   an anemometer in fluid communication with at least one of the inlet chamber and outlet chamber.

2. The flow sensor as defined by claim 1 further comprising a third pressure sensor within the inlet chamber, the first pressure sensor sensing a first pressure range, the third pressure sensor sensing a third pressure range, the first and third pressure ranges being different.

3. The flow sensor as defined by claim 1 further comprising a fourth pressure sensor within the outlet chamber, the second pressure sensor sensing a second pressure range, the fourth pressure sensor sensing a fourth pressure range, the second and fourth pressure ranges being different.

4. The flow sensor as defined by claim 1 wherein the first pressure sensor and the second pressure sensor are MEMS devices.

5. The flow sensor as defined by claim 1 further comprising a leadframe package containing the flow sensor.

6. The flow sensor as defined by claim 1 wherein the anemometer and first and second pressure sensors are formed on a single die.

7. The flow sensor as defined by claim 1 wherein the anemometer comprises a first element for detecting mass flow rate, the anemometer further comprising a second element for detecting fluid temperature, the first element being downstream of the second element.

8. A flow sensor comprising:
   an internal chamber;
   a differential pressure apparatus within the internal chamber; and
   a mass flow rate meter, distinct from the differential pressure apparatus, within the internal chamber.

9. The flow sensor as defined by claim 8 further comprising:
   a substrate supporting the differential pressure apparatus and the mass flow rate meter; and
   a cap secured to the substrate, the cap and substrate forming the internal chamber.

10. The flow sensor as defined by claim 8 wherein the mass flow rate meter comprises a hot film anemometer.

11. The flow sensor as defined by claim 8 wherein the internal chamber has an inlet chamber and an output chamber, further wherein the differential pressure apparatus comprises:
    a first pressure sensor within the inlet chamber; and
    a second pressure sensor within the outlet chamber.

12. The flow sensor as defined by claim 11 wherein the first pressure sensor detects a first pressure range within the inlet chamber, further wherein the second pressure sensor detects a second pressure range within the outlet chamber, the flow sensor further comprising:
    a third pressure sensor for detecting a third pressure range within the inlet chamber; and
    a fourth pressure sensor for detecting a fourth pressure range within the outlet chamber,
    the third pressure range being different from the first pressure range, the fourth pressure range being different from the second pressure range.

13. The flow sensor as defined by claim 8 wherein the differential pressure apparatus and the mass flow rate meter are MEMS devices on a single chip.

14. The flow sensor as defined by claim 13 further comprising a leadframe package substantially encapsulating the single chip, the package having an inlet opening to the chip and an outlet opening from the chip.

15. A flow sensor comprising:
    an internal chamber;
    means for detecting a differential pressure between two points within the internal chamber; and
    means, distinct from the differential pressure detecting means, for detecting the mass flow rate of a fluid flowing within the internal chamber.

16. The flow sensor as defined by claim 15 wherein the differential pressure detecting means includes a first pressure sensor within an inlet portion of the chamber, and a second pressure sensor within an outlet portion of the chamber.

17. The flow sensor as defined by claim 15 wherein the mass flow rate detecting means comprises a hot film anemometer.

18. The flow sensor as defined by claim 15 wherein the differential pressure detecting means and the mass flow rate detecting means are formed on a single die.

19. The flow sensor as defined by claim 15 wherein the differential pressure detecting means and the mass flow rate detecting means are MEMS devices.

* * * * *